США008989598B2

(12) United States Patent
Azadeh

(10) Patent No.: US 8,989,598 B2
(45) Date of Patent: Mar. 24, 2015

(54) POWER-SAVING DRIVER CIRCUIT FOR PROVIDING A BIAS CURRENT OR DRIVING A CURRENT-DRIVEN LOAD

(71) Applicant: Mohammad Azadeh, Northridge, CA (US)

(72) Inventor: Mohammad Azadeh, Northridge, CA (US)

(73) Assignee: Source Photonics, Inc., Chatsworth, CA (US)

( * ) Notice: Subject to any disclaimer, the term of this patent is extended or adjusted under 35 U.S.C. 154(b) by 105 days.

(21) Appl. No.: 13/649,969

(22) Filed: Oct. 11, 2012

(65) Prior Publication Data

US 2014/0105610 A1    Apr. 17, 2014

(51) Int. Cl.
*H04B 10/04* (2006.01)
*H04B 10/12* (2006.01)
*G01R 1/20* (2006.01)
*H03B 1/00* (2006.01)
*H03K 19/00* (2006.01)
*H01S 3/00* (2006.01)
*H05B 33/08* (2006.01)

(52) U.S. Cl.
CPC .................................. *H05B 33/0812* (2013.01)
USPC ........ 398/182; 307/154; 327/108; 372/38.01; 372/38.02

(58) Field of Classification Search
USPC ...................... 398/182–201; 372/38.1–38.09; 327/108–112
See application file for complete search history.

(56) References Cited

U.S. PATENT DOCUMENTS

| 6,292,284 B1* | 9/2001 | Takauji et al. ................. 398/197 |
| 7,065,303 B1* | 6/2006 | Kerem .......................... 398/197 |
| 2008/0150500 A1* | 6/2008 | Gurcan ......................... 323/271 |
| 2009/0256537 A1* | 10/2009 | Sato et al. ..................... 323/272 |
| 2009/0316743 A1* | 12/2009 | Alfrey ........................ 372/38.04 |
| 2012/0269215 A1* | 10/2012 | Lv .................................. 372/28 |

* cited by examiner

*Primary Examiner* — David Payne
*Assistant Examiner* — Casey Kretzer
(74) *Attorney, Agent, or Firm* — Andrew D. Fortney; Central California IP Group, P.C.

(57) ABSTRACT

Methods and circuits for providing a minimum driving voltage to a current-driven load (such as a laser diode) are disclosed. The circuit and methods may be useful for efficiently providing a bias and/or driving current to the current-driven load with minimal energy loss. The circuit generally comprises (1) a driver or voltage source configured to provide the bias and/or driving current to the current-driven load, (2) a sense circuit configured to (i) sense the bias and/or driving current and (ii) convert the bias and/or driving current to a first voltage, and (3) a comparator configured to (i) receive the first voltage and first and second reference voltages and (ii) provide a feedback/error signal to the driver or voltage source, the feedback/error signal configured to maintain or adjust the bias and/or driving current at or towards a target value.

19 Claims, 2 Drawing Sheets

POWER-SAVING DRIVER CIRCUIT FOR PROVIDING A BIAS CURRENT OR DRIVING A CURRENT-DRIVEN LOAD

FIELD OF THE INVENTION

The present invention generally relates to a circuit for driving a current driven load and/or providing a precise minimum bias current with improved (and optimally, maximum) power efficiency. More specifically, embodiments of the present invention pertain to methods and apparatuses for providing a bias and/or driving current to an optical and/or optoelectronic transmitter and/or transceiver.

DISCUSSION OF THE BACKGROUND

Laser diodes are current driven devices that receive a bias voltage or current from a current source. In conventional circuits (e.g., laser driving circuits) that provide a bias current to a laser diode or other current-driven load, a considerable amount of power may be wasted since the laser diode operates at an operating voltage (e.g., 1.8V) that is less than the bias voltage provided by or to the driving circuit (e.g., 3.3V).

For example, the available supply voltage VCC (for example, 3.3V) is received by the driver, and the laser requires a significantly smaller voltage (for example, from 1.2V to 1.8V, depending on the operating conditions). The difference between the 3.3V supply voltage and the actual operating voltage of the laser (e.g., 1.2-1.8V) is wasted as heat in the transistors of the driving circuit. In this case, the transistor(s) must dissipate 1.5 to 2.1V of power as heat. This dissipation of power is not only wasteful, but it generates thermal energy, which can also adversely affect the operation(s) of nearby circuitry and/or result in a need for an additional cooling element.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is directed to a circuit for providing and/or driving a current, comprising a driver configured to provide the bias and/or driving current to a current-driven load, a sense circuit configured to (a) sense the bias and/or driving current provided to the load and (b) convert the bias and/or driving current to a first voltage, and a comparator configured to (a) receive said first output voltage, a first reference voltage, and a second reference voltage, and (b) provide an error signal to the driver, the error signal being configured to adjust the bias and/or driving current. In various embodiments, the driver may comprise a DC-DC converter, and the load may comprise a laser diode. In some embodiments, the comparator comprises a current sense amplifier. A primary purpose of this invention is to save power. The use of a DC-DC converter that generates the voltage needed to provide the desired current to the load is significant, at least in part because DC-DC converters (which do not dissipate or otherwise consume power in a series element, such as a resistor or transistor) typically have much better efficiency than linear regulators.

Additional embodiments of the present invention relate to an optical and/or optoelectronic transmitter and/or transceiver and methods of providing a bias and/or driving current. The optical and/or optoelectronic transmitter and/or transceiver generally comprises the above circuit for providing a bias and/or driving current, a laser diode, and a microcontroller or microprocessor configured to control values of the first and second reference voltages provided to the comparator. In some embodiments, the laser diode is coupled to an input terminal of the sense circuit. In further embodiments, the comparator comprises first and second summing amplifiers.

The method of providing a bias and/or driving current generally includes (i) sensing a current provided from a driver (e.g., typically a DC-DC converter) to a current-driven load, (ii) converting the current to a first voltage, (iii) comparing the first voltage to a first reference voltage to determine a first comparison result, (iv) comparing the first comparison result to a second reference voltage to determine an error signal, and (v) providing the error signal to the driver (e.g., to maintain or adjust the bias and/or driving current). Generally, the current that is sensed is the bias and/or driving current. In some embodiments, sensing the current comprises determining a current flow through or voltage drop across a small sense resistor serially connected between the driver and the current-driven load. In further embodiments, converting the bias and/or driving current to a first voltage comprises providing the bias and/or driving current to a sense amplifier.

The present circuit advantageously provides a low-voltage, power-saving driver circuit that can be used to drive current-driven devices such as laser diodes or light emitting diodes (LEDs) in optical and/or optoelectronic transmitters and/or transceivers. By utilizing the present driving circuit, the voltage provided to a current-driven load such as a laser diode can have a minimum value sufficient to bias the load, thereby eliminating the power loss in conventional driver circuits (e.g., a load caused by a forward voltage drop across one or more current-driven devices). Thus, the present power-saving driving circuit increases efficiency and/or minimizes power consumption in comparison to conventional drivers for laser diodes.

These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "optical" and "optoelectronic" are generally used interchangeably herein, and use of any one of these terms also includes the others, unless the context clearly indicates otherwise. Additionally, the term "transceiver" refers to a device having at least one data receiver and at least one data transmitter, and use of the term "transceiver" also includes the terms "receiver" and "transmitter," unless the context clearly indicates otherwise. Also, for convenience and simplicity, the terms "connected to," "coupled with," "communicating with," and "coupled to" (which terms also refer to direct and/or indirect relationships between the connected, coupled and/or communicating elements unless the context of the term's use unambiguously indicates otherwise). Such terms may be used interchangeably, but these terms are also generally given their art-recognized meanings. Various embodiments and/or examples disclosed herein may be combined with other embodiments and/or examples, as long as such a combination is not explicitly disclosed herein as being unfavorable, undesirable or disadvantageous.

The present invention concerns methods and apparatuses for providing a bias and/or driving current to a current-driven load, such as a laser diode, and enjoys particular advantages in optical or optoelectronic transmitters and/or transceivers. By utilizing the present power-saving current driving circuit, a bias current can be provided to a laser diode or other current-driven load at an efficiency greater than that of conventional driving circuits. Thus, the present invention avoids the problems associated with conventional driver circuits (e.g., inefficient and/or wasteful power consumption). The invention, in its various aspects, will be explained in greater detail below with respect to exemplary embodiments.

An Exemplary Power-Saving Driver Circuit

Figure 1A:
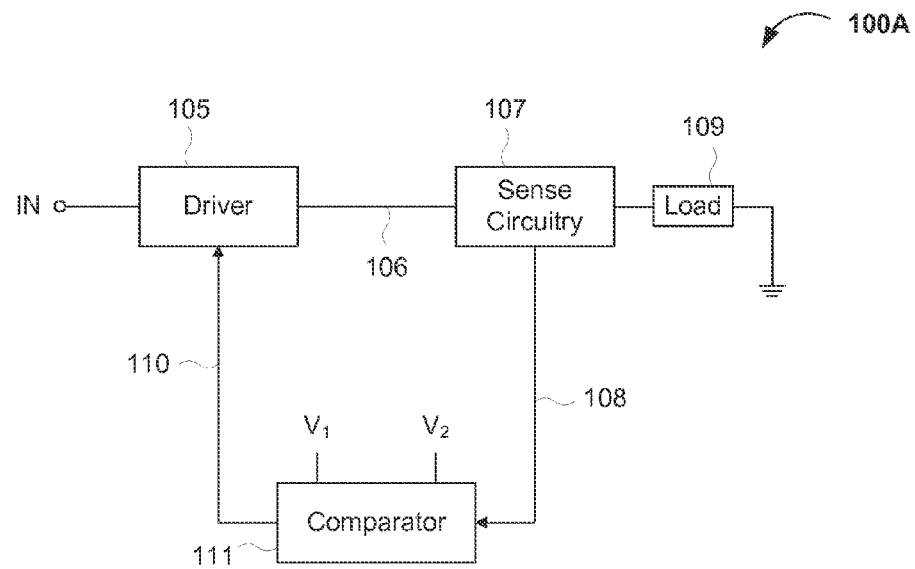
FIG. 1A is a block diagram of a driver circuit according to the present invention.

FIG. 1A shows a block diagram for an exemplary power-saving driving circuit 100A according to the present invention. As shown, the power-saving driving circuit 100A comprises a driver or voltage source 105, sense circuitry 107, and a comparator 111. The power-saving driving circuit 100A is coupled to a current-driven load 109. In general, the driver or voltage source 105 is a DC-DC voltage converter, which with the help of the sense circuitry 107, is regulated (e.g., using an optional regulator that may be included in the driver or voltage source 105) to provide or deliver a relatively precise (or exact) current for the load 109. In this way, the DC-DC voltage converter (typically a voltage source) functions as a current source.

Driver 105 can be any driver circuit or voltage source configured to provide a bias and/or driving current 106 to the load 109. In various examples, driver 105 may comprise a DC-to-DC converter and/or a switching voltage regulator. In one example, the load 109 comprises a laser diode, but the load 109 may be any electronic device, circuit or circuit element configured to be driven by an active current from the driver 105 (e.g., a LED).

Sense circuitry 107 can be any circuit or circuitry configured to (i) detect or sense the bias and/or driving current 106 provided to the current-driven load 109 and (ii) convert the bias and/or driving current 106 to a voltage 108. In some embodiments, sense circuitry 107 comprises a resistor (e.g., a "sense" resistor) and one or more amplifier(s) (not shown in FIG. 1A). In such embodiments, the resistor can be serially connected between the driver 105 and current-driven load 109. Generally, the resistor has a relatively small or minimum resistance value, and it adds a relatively small or minimal impedance to the circuit 100A (e.g., as discussed below in greater detail with respect to FIG. 1B). The amplifier(s) may comprise a sense amplifier that detects or senses the bias and/or driving current 106, and converts the bias and/or driving current 106 to a corresponding voltage 108. The present power-saving driving circuit 100A is current sensitive and, unlike conventional driver circuits, can operate at the minimum voltage required to drive the current-driven load 109. In any embodiment, the voltage 108 is provided to comparator 111.

As shown, comparator 111 receives (i) the voltage 108 from sense circuitry 107 and (ii) first and second reference voltages $V_1$ and $V_2$, respectively. The first and second reference voltages can be provided by one or more external voltage source(s) and/or one or more on-chip voltage regulators or voltage generators (not shown). In general, the first reference voltage is equal to or about a target value for the output of the sense circuitry 107, and the second reference voltage is equal to or about 0 V or other predetermined value that enables the feedback signal to have a value within a linear or other optimal range of values for controlling the output of the driver circuit 105. The bias and/or driving current 106 provided by driver 105 is dependent on at least one (and generally both) of the first and second reference voltages $V_1$ and $V_2$.

Based on a result of one or more comparisons (e.g., a comparison between voltage 108 and the first reference voltage $V_1$, a comparison between second reference voltage $V_2$ and a result of the comparison between voltage 108 and the first reference voltage $V_1$, etc.), comparator 111 provides an error or feedback signal 110 to driver 105. Based on the value of the feedback signal 110, the driver 105 maintains or adjusts the value of its own output voltage. Because the present power-saving driving circuit 100A does not require a transistor or other series element in the current path from the driver 105 to the load 109 like linear current sources or standard laser drivers, the present power-saving driving circuit 100A can operate at a voltage equal to (or perhaps slightly greater than) the minimum voltage necessary to operate the load 109.

Thus, the present power-saving driver circuit detects or senses a bias and/or driving current 106 provided to a current-driven load 109, and based on the feedback signal provided by the comparator 111, maintains or adjusts the output voltage of the driver 105. In comparison to conventional driver circuits, an output of the power-saving driver circuit 100A is current sensitive, and the operating voltage of the driver 105 that provides the driving current to the current-driven load 109 may be a minimum voltage (e.g., 1.5v, 1.8V, 2.0V, etc.) to drive the load 109. Thus, the present circuit 100A can significantly reduce or eliminate the power loss experienced in conventional driver circuits due to the forward voltage drop of the transistor or other series control element(s) in the current path from the driver 105 to the load 109.

An Exemplary Circuit for Providing a Bias and/or Driving Current

Figure 1B:
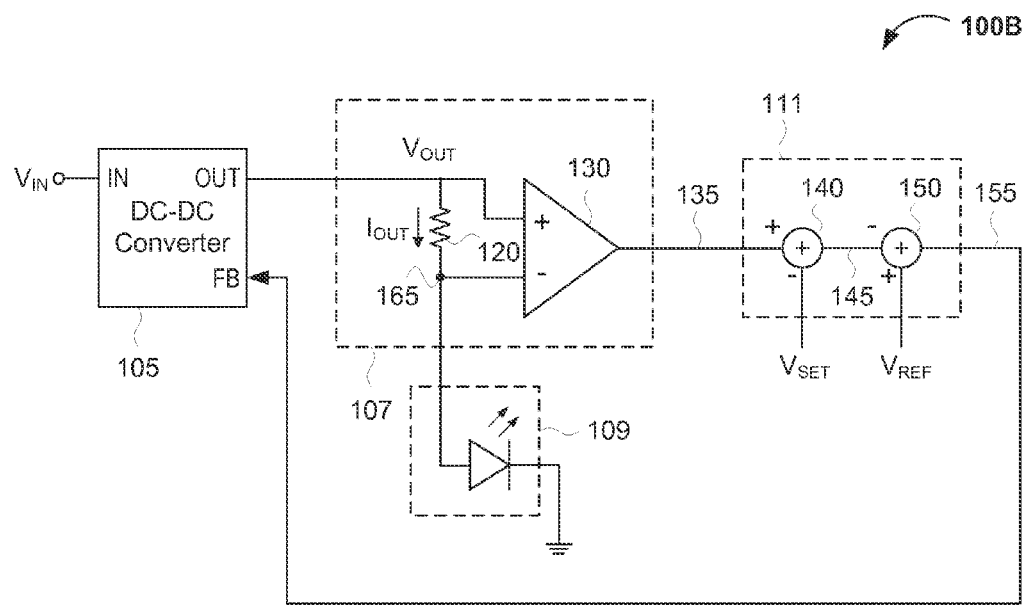
FIG. 1B is a more detailed diagram of an exemplary driver circuit according to the present invention.

FIG. 1B shows an exemplary embodiment of a driving circuit 100B according to the present invention. As shown, driving circuit 100B comprises a driver (e.g., a DC-DC converter) 105, a sensing circuit 107, a comparator 111, and a current-driven load (e.g., laser diode) 109. As shown, driving circuit 100B comprises exemplary circuitry for the driving circuit 100A of FIG. 1A, and those structures having the same identification numbers discussed below with respect to FIG. 1B may be substantially the same as and/or equivalent to the structures discussed above with respect to FIG. 1A. For example, driver 105 can be the same as or equivalent to that discussed above with respect to FIG. 1A. That is, driver 105 can be a DC-DC converter (e.g., a switching converter) configured to convert a first voltage (e.g., an input voltage) to a second voltage (e.g., an output voltage) that is different from (e.g., less than) the first voltage. In one example, the DC-DC converter may comprise a step-down DC-DC converter.

As shown, sensing circuit 107 comprises a sense resistor 120 and a first amplifier 130. Resistor 120 can be any device configured to provide a resistance. However, as discussed above, resistor 120 generally has a relatively small value that adds a minimal impedance and/or load to the output of the DC-DC converter 105. For example, resistor 120 generally has a resistance value of less than one ohm (e.g., from about 0.1, 0.2, 0.3, 0.5, or less ohms to about 0.65, 0.7, 0.8, or 0.9 ohms). The first amplifier 130 is generally a sense amplifier (e.g., a current sense amplifier). However, amplifier 130 can comprise any other amplifier or circuit configured to determine a bias and/or driving current and provide or output a voltage corresponding to the detected bias and/or driving current.

Comparator 111 comprises a second amplifier 140 and a third amplifier 150. Second amplifier 140 and third amplifier 150 are each generally summing amplifiers, but may comprise any amplifier configured to provide an output voltage corresponding to a sum of (or, equivalently, a difference between) the received and/or input voltages. Second and third amplifiers 140 and 150, respectively, generally have a gain of one (in which case the amplifiers 140 and 150 may each comprise an adder or subtractor), but amplifiers 140 and 150 can have any gain value (e.g., from 1.1 to 10 or more, from 1.5 to 5, from 2 to 4, etc., or any value or range of values greater than 1) sufficient to enable DC-DC converter 105 to maintain, control and/or adjust the bias or driving current to the current-driven load 109. In some embodiments, as shown, the current-driven loan 109 comprises a laser diode. In further embodiments, the current-driven loan 109 is a light-emitting diode (LED) or any other current-driven device configured to generate light pulses (e.g., optical signals) over an optical signal medium (e.g., air, an optical fiber [not shown], etc.).

As shown, driver 105 receives an input voltage (e.g., a voltage received from optical and/or optoelectronic transmitter and/or transceiver circuitry, not shown in FIG. 1B). In some embodiments, the received input voltage is in the range of from about 1.5 V to about 5 V (e.g., about 2.5 V, 3 V, 3.3 V, 4.5 V, 5 V or any other value or range of values of at least 1.8 V). In any embodiment, the driver (DC-DC converter) 105 converts the received input voltage to a second voltage less than the input voltage (e.g., by a predetermined amount) and equal to or slightly greater than the operating voltage that is necessary for driving laser diode 109. For example, the second voltage may be from about 0.5 V to about 2 V (e.g., 0.8 V, 1 V, 1.2 V, 1.5 V, 1.8 V, etc.), and the predetermined amount by which the voltage is reduced by DC-DC converter 105 may be from 0.2 V to about 4 V (e.g., from 0.3 V to about 2.5 V or any value or other range of values therein). The output voltage of driver 105 provides a bias, load, and/or driving current $I_{OUT}$, which is provided to a first terminal of resistor 120 (e.g., $R_{SENSE}$), and to an input terminal (e.g., a positive input terminal) of sense amplifier 130.

A second input terminal (e.g., a negative input terminal) of first amplifier 130 is coupled to the other terminal of resistor 120 at node 165. As shown, node 165 is also coupled to a first terminal or pin (e.g., an anode terminal) of the current-driven load 109, and the other terminal or pin (e.g., a cathode pin) of current-driven load 109 is coupled to a ground terminal or potential of about 0 V.

Generally, first amplifier 130 is a current sense amplifier having a gain or amplitude $A_1$. In the present configuration, first amplifier 130 senses or determines the value of the bias and/or driving current $I_{OUT}$ that flows through resistor 120, and converts the bias and/or driving current $I_{OUT}$ to a voltage 135 that is proportional to the bias and/or driving current $I_{OUT}$. Thus, the resistance of resistor 120 and the gain of the sense amplifier 130 can be selected so that the mathematical relationship between the bias and/or driving current $I_{OUT}$ and voltage 135 is known.

Voltage 135 is provided to a first input terminal (e.g., a positive input terminal) of the second amplifier 140. A second input terminal (e.g., a negative input terminal) of second amplifier 140 is coupled to a first reference voltage (e.g., $V_{SET}$), wherein:

$$V_{SET} = I_{OUT}(A_1 * R_{SENSE}) \quad [1]$$

or stated differently, $$I_{OUT} = V_{SET}/(A_1 * R_{SENSE}) \quad [2]$$

where $I_{OUT}$ is the desired or target current to flow through the load.

The first reference voltage $V_{SET}$ can be provided by an internal or external voltage source (e.g., an external power supply [which can be passed through a conventional step-down or step-up circuit], a voltage generator or resistor-divider network, etc.). During normal operating conditions, in one embodiment, the first reference voltage $V_{SET}$ sets the target current to flow into the diode 109. Thus, $V_{SET}$ generally causes the dc-dc converter circuit 105 to generate a voltage equal to the theoretical minimum voltage for driving the laser diode 109 plus some margin to account for processing variations (e.g., in the driver 105, the laser diode 109, etc.), supply voltage fluctuations, etc. This margin may be, e.g., from 1% to 20% of the theoretical minimum voltage for driving the laser diode 109, or any value or range of values therein.

In one embodiment, during typical operating conditions, the negative terminal of the summing/difference amplifier 140 receives $V_{SET}$, and the positive terminal of summing/difference amplifier 140 receives a voltage 135 corresponding to the current $I_{OUT}$ provided by the output voltage from the driver 105. The summing/difference amplifier 140 determines the difference between voltage 135 and $V_{SET}$ (or sums a negative value of $V_{SET}$ with a positive value of voltage 135, or vice versa) and provides an output voltage 145. In this embodiment, output voltage 145 will typically be equal to or about 0 V. Thus, since $V_{SET}$ corresponds or is proportional to bias and/or driving current $I_{OUT}$ as shown in Equations [1] and [2] above, by setting reference voltage $V_{SET}$, the bias and/or driving current $I_{OUT}$ is set, while the generated voltage $V_{OUT}$ is effectively maintained at or adjusted to the minimum value necessary to drive the current-driven load 109.

The output voltage 145 of the second amplifier 140 is provided to a first terminal (e.g., a negative input terminal) of the third amplifier 150. Third amplifier 150 also receives a second reference voltage (e.g., $V_{REF}$) at a second input terminal (e.g., a positive input terminal). The second reference voltage $V_{REF}$ generally has a value effective to maintain the bias and/or driving current $I_{OUT}$ at a minimum value necessary to drive the current-driven load 109. Thus, one role of the second amplifier 140 is to translate the error/feedback signal 155 to a level compatible with the feedback voltage typically received by the DC-DC converter 105. Third amplifier 150 determines the difference between the values of the received input signals (e.g., voltage 145 and $V_{REF}$) and provides an error or feedback signal or voltage 155 to DC-DC converter 105. Alternatively, the third amplifier 150 sums a positive input voltage (e.g., $V_{REF}$) with a negative input voltage (e.g., voltage 145). In one embodiment, the negative terminal of third amplifier 150 receives a voltage 145 that under typical steady-state operating conditions is equal to or about 0 V, and the positive terminal of third amplifier 150 receives $V_{REF}$. Thus, during typical steady-state operating conditions in this one embodiment, the feedback/error signal 155 has a value equal to $V_{REF}$ (e.g., $V_{REF}$+/−0 V). Although amplifiers 140 and 150 are described with respect to an embodiment in which the gain of each amplifier is about 1, gains of significantly greater than 1 (e.g., 2 or more, 5 or more, 10 or more, etc.) can be used to increase the sensitivity of the amplifiers, and thus, increase the sensitivity and/or useful range of the feedback/error signal 155.

As discussed above, and referring again to FIG. 1B, the feedback/error signal 155 is provided to driver 105 (e.g., at a feedback pin of the DC-DC converter 105). Error signal 155, in conjunction with $V_{SET}$, is utilized by driver 105 to maintain or adjust the voltage $V_{OUT}$, and through it, the bias and/or driving current $I_{OUT}$ provided to current-driven load 109. For example, when the bias and/or driving current $I_{OUT}$ corresponds to the target current for driving the load 109, the circuit 100B is in a stable steady state, and the bias and/or driving current $I_{OUT}$ is maintained. On the other hand, when the bias and/or driving current $I_{OUT}$ exceeds the target current for driving the load 109, the output voltage 145 of the first summing/difference amplifier 140 is positive, and the feedback/error signal 155 from the second summing/difference amplifier 150 is less than the second reference voltage $V_{REF}$. This results in DC-DC converter 105 reducing its output voltage, and thereby reducing the bias and/or driving current $I_{OUT}$. Similarly, when the bias and/or driving current $I_{OUT}$ is below the target minimum current for driving the load 109, the output voltage 145 of the first summing/difference amplifier 140 is negative, and the feedback/error signal 155 from the second summing/difference amplifier 150 is greater than the second reference voltage $V_{REF}$. This results in DC-DC converter 105 increasing its output voltage, and thereby increasing the bias and/or driving current $I_{OUT}$.

In many embodiments, the present driver circuit 100B utilizes a switching DC-DC converter 105 as a low-voltage current source to provide a bias and/or driving current $I_{OUT}$ to a laser diode 109 or other current-driven device (not shown). By eliminating the requirement to compensate for a forward voltage drop across a transistor, the driving circuit 100B has an increased efficiency and minimal power requirements in comparison to conventional laser drivers.

An Exemplary Optical and/or Optoelectronic Transmitter and/or Transceiver

Figure 2:
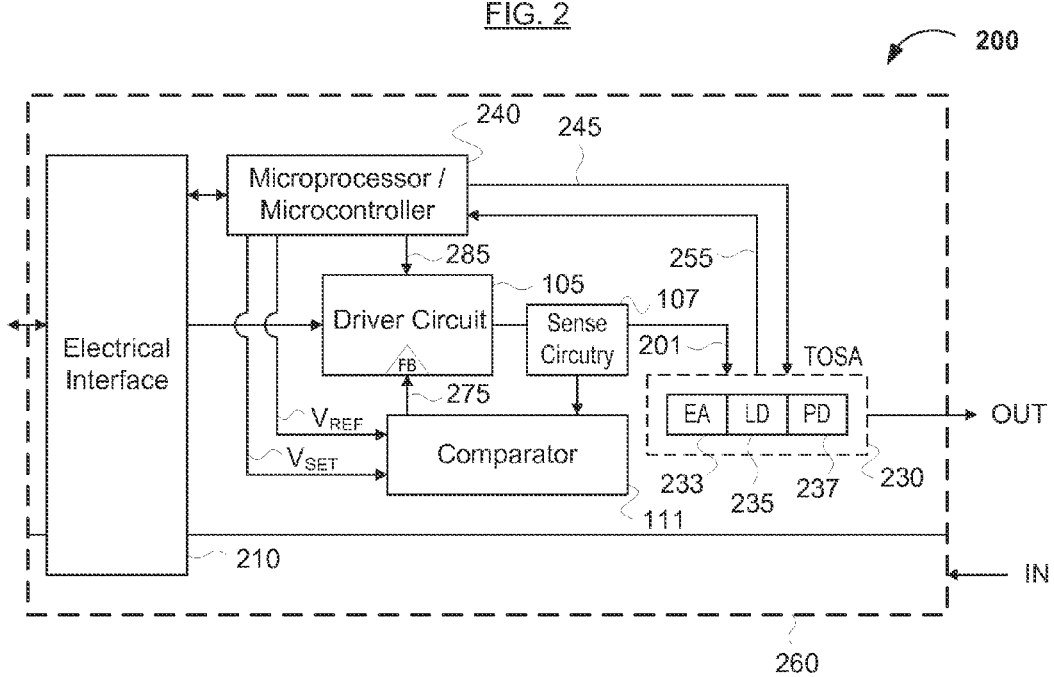
FIG. 2 is a block diagram showing an exemplary optical and/or optoelectronic transceiver and/or transmitter including a driver circuit according to the present invention.

FIG. 2 illustrates an exemplary embodiment of an optical and/or optoelectronic transmitter and/or transceiver (e.g., a small form-factor pluggable [SFP] transceiver, a SFP+ transceiver, etc.) 200 according to the present invention. As shown, transceiver 200 comprises an electrical interface 210, microprocessor/microcontroller 240, transmitter optical subassembly (TOSA) 230, sense circuitry 107, driver circuit 105, comparator 111, and receiver portion 260.

Electrical interface 210 can be any interface capable of accurately and/or effectively transferring data and/or signals between an external host (not shown) and components of the transceiver 200 (e.g., microprocessor/microcontroller 240, driver circuit 105, receiver 260, etc.). Microprocessor or microcontroller 240 can be or comprise a microprocessor, microcontroller, field programmable gate array (FPGA), application specific integrated circuit (ASIC), or complex programmable logic device (CPLD) configured to control and/or adjust various functions of optical transceiver 200. For example, microprocessor or microcontroller 240 may provide a signal 245 to control, maintain or adjust the modulation of one or more signals to the laser diode 235 in transmitter optical subassembly (TOSA) 230 or that otherwise controls an output (e.g., the pulse width) of the laser diode 235. Additionally, microprocessor or microcontroller 240 may provide a first reference voltage (e.g., $V_{SET}$) and a second reference voltage (e.g., $V_{REF}$) to comparator 111. Alternatively, the first and second reference voltages $V_{SET}$ and $V_{REF}$ may be provided by the electrical interface 210 or other circuitry (not shown) in the transceiver 200. Comparator 111 can be the same as or similar to that discussed above with respect to FIGS. 1A-1B.

Furthermore, the driver circuit 105 is configured to provide a bias and/or driving current 201 to TOSA 230. In some embodiments, driver circuit 105 comprises a DC-DC converter (not shown) such as the DC-DC converter 105 discussed above with respect to FIGS. 1A-1B. The bias and/or driving current provided from driver circuit 105 to TOSA 230 can be pulse width modulated (PWM), and programmed to provide a predetermined power (e.g., a power that can be controlled and/or regulated to stay within an operating temperature range or below a maximum operating temperature of the laser diode 235). Generally, TOSA 230 comprises laser diode 235, an electro-absorption (EA) modulator 233, and a sensing photodiode 237. Electro-absorption (EA) modulator 233 is used to modulate an output of the laser diode 235. Sensing photodiode 237 is used to determine an output characteristic (e.g., power) of the laser diode 235 and provide a feedback signal 255 to the microprocessor 240. In some embodiments, laser diode 235 is a directly modulated laser (DML), an electro-absorption modulated laser (EML), a vertical cavity surface emitting laser (VSCEL), or a distributed feedback laser diode (DFB-LD). In various embodiments, the same or a substantially similar analog feedback as described in the background section of this can be implemented entirely in the microprocessor/microcontroller 240 or other digital signal processor (DSP) block (not shown).

In some embodiments (not shown), receiver portion 260 comprises a receiver optical subassembly (ROSA) configured to receive an optical input signal (e.g., optical input signal IN received from an optical signal medium such as a fiber optic cable) and provide an electrical output signal (e.g., via a limiting amplifier and/or a transimpedance amplifier) to electrical interface 210.

The present optical and/or optoelectronic transceiver 200 utilizes a sensed and/or regulated minimum bias and/or driving current 201 to drive the laser diode 235. In various embodiments, electrical interface 210 can receive and/or transfer a signal (e.g., from an external host) to set or adjust the value of the first reference voltage $V_{SET}$ and/or the second reference voltage $V_{REF}$ provided to the comparator 111. As discussed above, the value of the first reference voltage $V_{SET}$ determines the value of the bias and/or driving current $I_{OUT}$ provided to TOSA 230 (e.g., according to Equations [1] and [2] discussed above with respect to FIG. 1B). Alternatively, the values of $V_{SET}$ and/or $V_{REF}$ may be determined by design or at the time of manufacturing, and may not be adjustable or otherwise changed thereafter. In general, the first reference and second reference voltages $V_{SET}$ and $V_{REF}$ are provided to comparator 111, and the bias and/or driving current $I_{OUT}$ based on $V_{SET}$ is provided to TOSA 230.

As described above with respect to FIGS. 1A-B, sense circuitry 107 and comparator 111 sense and/or monitor the bias and/or driving current $I_{OUT}$, and provide a feedback or error signal 275 to driver circuit 105. In some embodiments, the signal 275 is provided to a feedback (FB) terminal of the driver circuit 105. Error signal 275 is generally the same as or similar to feedback/error signal 155 provided by the third amplifier 150 in FIG. 1B. That is, signal 275 maintains and, in some embodiments, adjusts (e.g., increases or decreases) the bias and/or driving current 201 provided by the driver circuit 105 at a reduced or minimum value for driving laser diode 235.

Thus, the present optical transmitter/transceiver 200 is more efficient and draws less power than optical transmitters and/or transceivers utilizing conventional driving circuitry. That is, the present optical and/or optoelectronic transceiver/transmitter reduces or avoids power loss caused by the forward voltage drop across a regulating transistor in conventional driver circuits.

An Exemplary Method of Driving a Laser Diode

An embodiment of the present invention relates to a method for providing a bias or driving current to a laser diode. The method generally comprises (i) sensing a driving current provided by a voltage source to a current-driven load (such as a laser diode), (ii) converting the driving current to a first voltage, (iii) comparing the first voltage to a first reference voltage to determine a first comparison result, (iv) comparing the first comparison result to a second reference voltage to determine an error signal, and (v) providing the error signal to the voltage source. In some embodiments, the voltage source comprises a driver circuit such as a DC-DC converter, and/or sensing the driving current comprises determining a voltage drop across a resistor serially connected between the voltage source and the load. In further embodiments, converting the driving current to the first voltage comprises outputting the voltage across the resistor from a sense amplifier.

The method generally relates to the use of a voltage source such as a DC-DC switching converter that generates an exact voltage (which may also be a variable and/or minimum voltage) needed by the load, to minimize power consumption and maximize efficiency. By taking the feedback signal from current to the load, the voltage source functions as a current source, so regardless of the voltage needed by the load, the current is maintained. As a result, the actual voltage provided by the driver (e.g., DC-DC converter 105) can change, and in general, will change. For example, in the case of the load being a laser diode, the voltage provided by the DC-DC converter may increase when the temperature goes up. However, regardless of the DC-DC converter output voltage changes, the current is maintained, and in all cases, the driver (e.g., DC-DC converter 105) generates the exact and/or minimum voltage needed for that condition (i.e., the minimum voltage to provide the current for driving the load), without extra power being wasted in other series elements, as is the case in conventional circuits for driving current-driven loads. In more sophisticated implementations, the current may also be adjusted.

Figure 3:
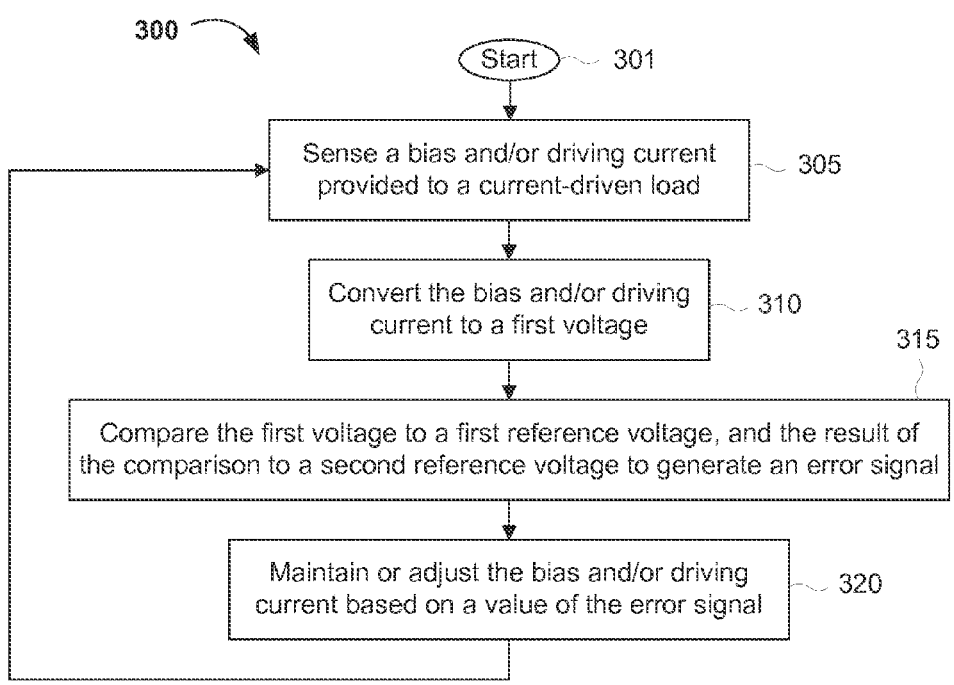
FIG. 3 is a flow chart showing an exemplary method of providing a bias and/or driving current to a laser diode or other current-driven loan according to the present invention.

FIG. 3 illustrates an exemplary flowchart 300 for a method for providing a bias and/or driving current to a current-driven load such as a laser diode (e.g., in an optical and/or optoelectronic device). At 301, the method begins, and at 305, a driving current provided to the current-driven load is determined or sensed. For example, the driving current can be provided by a driver, such as the DC-DC switching voltage discussed above (e.g., see 105 in FIGS. 1A, 1B, and 2). In one embodiment, the method further comprises coupling a resistance (e.g., a resistor) between an output of the driver and an input of the current-driven load (e.g., the laser diode), and utilizing an amplifier to determine a current flow through or a voltage drop across the resistor. For example, the sense amplifier (e.g., first amplifier 130 discussed above with respect to FIG. 1A) may receive a first input from a first node between the driver and the resistor, and a second input from a second node between the resistor and the current-driven load.

At 310, the driving current is converted to a voltage. In embodiments involving a sense amplifier, the sense amplifier converts the driving current to a first voltage. In one example, the first voltage corresponds to an output voltage of the driver. At 315, the method comprises comparing the first voltage to a first reference voltage. For example, comparing the first voltage to the first reference voltage may comprise providing the first voltage and the first reference voltage to a first summing or difference amplifier to determine a first comparison result. For example, the first summing amplifier may be the same as first amplifier 130 discussed above with respect to FIG. 1B. In general, the first reference voltage is equal to or about the target minimum voltage for driving the current-driven load. Alternatively, the first reference voltage has a value equal to the theoretical minimum voltage for driving the current-driven load plus a predetermined margin.

At 315, the method comprises generating a feedback and/or error signal based on the first comparison result. In some embodiments, generating the feedback and/or error signal comprises adding, summing, comparing or determining the difference between the first comparison result and a second reference voltage. For example, generating the feedback and/or error signal may comprise providing the first comparison result and the second reference voltage to a summing/difference amplifier. In one embodiment, the second reference voltage has a value that causes the driver to provide the minimum driving current necessary to drive the current-driven load. In some embodiments, the gain of the second summing/difference amplifier is equal to the gain of the first summing/difference amplifier (e.g., a gain of one), in which case the first and second summing/difference amplifiers may each comprise an adder or subtractor. In embodiments where the summing/difference amplifiers are in an optical or optoelectronic transceiver or transmitter, the first and second reference voltage can be provided from an external voltage source (e.g., via an electrical interface), an internal voltage generator, a resistor-based voltage divider, etc.

At 320, the driving current is maintained or adjusted based on the value of the feedback/error signal. In general, the feedback/error signal is provided directly or indirectly to the driver circuit or voltage source. For example, the feedback/error signal can be provided to a feedback terminal of a DC-DC converter that functions as a voltage source that provides the current. When the feedback/error signal has a voltage equal to or about the second reference voltage, the method comprises maintaining the driving and/or bias current. When the feedback/error signal has a voltage less than that of the second reference voltage, the method may comprise decreasing the driving and/or bias current. When the feedback/error signal has a voltage greater than that of the second reference voltage, the method comprises increasing the driving and/or bias current. During normal steady-state operating conditions, the feedback/error signal may have a voltage equal to that of the second reference voltage. In general, the method continuously returns to 305 and senses the driving current provided to the current-driven load, regardless of whether the driving/bias current has been adjusted or maintained. Naturally, the present method can further include additional and/or alternative functions and/or steps as described above with regard to various embodiments of the exemplary circuit for providing a bias and/or driving current.

Thus, the present method can use the smallest possible bias and/or driving current to drive a current-driven load by sensing a bias and/or driving current provided from a voltage source to a current-driven load such as a laser diode, converting the bias and/or driving current to a voltage, and sequentially comparing the voltage to first and second reference voltages to provide a feedback and/or error signal to the voltage source. The feedback and/or error signal generally maintains the bias and/or driving current at the smallest possible value, but can also increase or decrease the bias and/or driving current. Thus, the present method can reduce or minimize the voltage used to provide the bias and/or driving current and avoid the forward voltage drop in conventional driving circuits (e.g., resulting in decreased and/or more efficient power consumption).

CONCLUSION/SUMMARY

Thus, the present invention concerns a circuit that provides a bias and/or driving current to a current-driven load (such as a laser diode), and methods of maintaining and/or adjusting such a bias and/or driving current. The present invention advantageously reduces or minimizes power consumption in current driving circuits (e.g., such as those used in optical and or optoelectronic transceivers and/or transmitters). The bias and/or driving current provided to the current-driven load in accordance with the present circuit and/or methods can be at the minimum or smallest possible operating voltage for driving the current-driven load, thereby eliminating power loss that occurs as a result of a forward voltage drop in conventional driver circuits (i.e., caused by a transistor in the path between a laser driver and a laser diode).

In the present invention, a voltage source such as a DC-DC switching converter is used to generate an exact (and, optionally, variable and/or minimal) voltage needed by the load, to minimize power consumption and maximize efficiency. By taking a feedback signal from a current to the load, the voltage source acts as a current source. As a result, the current is maintained, regardless of the voltage needed by the load. In general, the actual voltage may change, and in the case of a laser diode, for example, the actual voltage may increase when the temperature goes up. Regardless of the voltage changes, the current is maintained, and the DC-DC converter can generate the exact voltage needed to maintain the current in substantially all cases, without any extra power wasted by other series elements, as is the case in conventional circuits. In more sophisticated implementations, the current may be adjusted as well.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A circuit configured to provide a bias and/or driving current, comprising:
    a) a driver configured to provide said bias and/or driving current to a current-driven load;
    b) a sense circuit configured to (i) sense said bias and/or driving current and (ii) convert said bias and/or driving current to a first voltage; and
    c) a comparator comprising (i) a first amplifier configured to receive said first voltage and a first reference voltage, and provide an output voltage, and (ii) a second amplifier configured to receive said output voltage and a second reference voltage, and provide a feedback and/or error signal to said driver, said feedback and/or error signal configured to maintain or adjust said bias and/or driving current at or towards a target value; and
    d) a microcontroller or microprocessor configured to control values of the first and second reference voltages provided to the comparator,
    wherein the value of the first reference voltage corresponds to or is proportional to the bias and/or driving current, and the value of the second reference voltage maintains the bias and/or driving current at a minimum value necessary to drive the current-driven load.

2. The circuit of claim 1, wherein said driver comprises a DC-DC converter.

3. The circuit of claim 1, wherein said sense circuit comprises a current sense amplifier.

4. The circuit of claim 3, wherein said sense circuit further comprises a resistor serially connected between said driver and said current-driven load, and said current sense amplifier has first and second input terminals respectively connected across said resistor.

5. The circuit of claim 4, wherein said current-driven load comprises a laser diode.

6. An optical transceiver, comprising the circuit of claim 5, wherein the microcontroller or microprocessor is configured to control said bias and/or driving current.

7. The circuit of claim 1, wherein said comparator comprises a first amplifier configured to receive said first voltage and said first reference voltage and output a first comparison result, and a second amplifier configured to receive said first comparison result and said second reference voltage and output said feedback and/or error signal.

8. The optical transceiver of claim 6, wherein said laser diode is coupled to an input terminal of said sense circuit.

9. The optical transceiver of claim 6, further comprising an electro-absorption (EA) modulator that modulates an output of the laser diode.

10. The optical transceiver of claim 6, further comprising a sensing photodiode that determines an output characteristic of the laser diode and provides a feedback signal to the microprocessor.

11. A method of providing a bias and/or driving current to a current-driven load, comprising:
    a) sensing said bias and/or driving current from a voltage source to said current-driven load;
    b) converting said bias and/or driving current to a first voltage;
    c) adding, subtracting, or comparing the first voltage and a first reference voltage to determine a first comparison result, wherein the value of the first reference voltage corresponds to or is proportional to the bias and/or driving current;
    d) adding, subtracting, or comparing the first comparison result and a second reference voltage to generate a feedback and/or error signal, wherein the value of the second reference voltage maintains the bias and/or driving current at a minimum value necessary to drive the current-driven load; and
    e) providing said feedback and/or error signal to said voltage source.

12. The method of claim 11, wherein said voltage source comprises a DC-DC converter.

13. The method of claim 11, wherein said current-driven load comprises a laser diode.

14. The method of claim 11, wherein sensing said bias and/or driving current comprises determining a current flow or voltage drop through a resistor serially connected between said voltage source and said current-driven load.

15. The method of claim 14, wherein converting said bias and/or driving current to said first voltage comprises providing said current or said voltage drop to first and second input terminals of a sense amplifier.

16. The method of claim 11, further comprising decreasing said first reference voltage when said feedback and/or error signal has a value greater than that of said second reference voltage.

17. The method of claim 11, further comprising increasing said first reference voltage when said feedback and/or error signal has a value less than that of said second reference voltage.

18. The method of claim 11, wherein said first reference voltage is equal to or about a minimum voltage for driving said current-driven load, optionally plus a margin voltage.

19. The method of claim 11, wherein said feedback and/or error signal is configured to maintain or adjust said bias and/or driving current.

* * * * *